US010999228B2

(12) United States Patent
Stahl et al.

(10) Patent No.: US 10,999,228 B2
(45) Date of Patent: May 4, 2021

(54) CHAT VIDEOS

(71) Applicant: Yahoo!, Inc., Sunnyvale, CA (US)

(72) Inventors: Benjamin David Stahl, Santa Clara, CA (US); Howard Lee Kim, Sunnyvale, CA (US); Geoffrey Richard Nelson, Oakland, CA (US)

(73) Assignee: Verizon Media Inc., New York, NY (US)

( * ) Notice: Subject to any disclaimer, the term of this patent is extended or adjusted under 35 U.S.C. 154(b) by 238 days.

(21) Appl. No.: 15/496,109

(22) Filed: Apr. 25, 2017

(65) Prior Publication Data
US 2018/0309705 A1 Oct. 25, 2018

(51) Int. Cl.
| *H04L 12/58* | (2006.01) |
| *H04N 5/76* | (2006.01) |
| *H04N 7/15* | (2006.01) |
| *H04N 5/272* | (2006.01) |

(52) U.S. Cl.
CPC .............. *H04L 51/10* (2013.01); *H04L 51/16* (2013.01); *H04N 5/272* (2013.01); *H04N 5/76* (2013.01); *H04N 7/157* (2013.01)

(58) Field of Classification Search
CPC ......... H04L 51/10; H04L 51/16; H04L 51/32; H04N 7/157; H04N 5/76; H04N 5/272
See application file for complete search history.

(56) References Cited

U.S. PATENT DOCUMENTS

| 5,793,658 | A | * | 8/1998 | Adiletta | G06T 9/007 382/166 |
| 8,405,705 | B2 | * | 3/2013 | Asthana | H04L 12/18 348/14.09 |
| 2009/0204402 | A1 | * | 8/2009 | Marwaha | G06Q 10/10 704/260 |
| 2009/0307614 | A1 | * | 12/2009 | Craig | G06Q 10/107 715/758 |
| 2010/0299344 | A1 | * | 11/2010 | Barbieri | G06F 17/30056 707/767 |

(Continued)

OTHER PUBLICATIONS

Cronin, Matt. 10 Principles of Readability and Web Typography. Smashing Magazine, [online]. Mar. 18, 2009. [retrieved on Dec. 20, 2018]. Retrieved from the Internet <URL:https://www.smashingmagazine.com/2009/03/10-principles-for-readable-web-typography/ >.*

(Continued)

*Primary Examiner* — John T Repsher, III
(74) *Attorney, Agent, or Firm* — Cooper Legal Group, LLC

(57) ABSTRACT

One or more computing devices, systems, and/or methods for constructing a chat video are provided. For example, a user may define a participant definition defining one or more participants for a conversation to playback through the chat video. The user may define a sequence of content items (e.g., images, videos, text, emojis, emoticons, etc.) that are to be displayed through a chat interface for the conversation. A sequence of message elements (e.g., chat bubbles) are constructed based upon the participant definition and/or the sequence of content items. A message element comprises a content item and is assigned to a participant. The sequence of message elements are surfaced through the chat interface to visually present the conversation as a rendering used to construct the chat video.

20 Claims, 10 Drawing Sheets

(56) References Cited

U.S. PATENT DOCUMENTS

| | | | | |
|---|---|---|---|---|
| 2012/0259927 | A1* | 10/2012 | Lockhart | H04L 51/10 709/206 |
| 2013/0216206 | A1* | 8/2013 | Dubin | H04N 9/87 386/282 |
| 2014/0013268 | A1* | 1/2014 | White | G06Q 10/107 715/780 |
| 2014/0349627 | A1* | 11/2014 | Choi | H04W 4/08 455/416 |
| 2015/0121251 | A1* | 4/2015 | Kadirvel | H04M 1/72544 715/753 |
| 2015/0263996 | A1* | 9/2015 | Abate | H04M 1/72552 715/753 |
| 2015/0309720 | A1* | 10/2015 | Fisher | G06F 3/04847 715/752 |
| 2016/0149839 | A1* | 5/2016 | Yi | H04L 67/1095 709/206 |
| 2017/0017700 | A1* | 1/2017 | Mehrotra | G06F 16/248 |
| 2017/0111308 | A1* | 4/2017 | Kim | H04L 51/34 |

OTHER PUBLICATIONS

Screen captures from YouTube video clip entitled "After Effects Tutorial: How to Create a Text Messaging Animation," 18 pages, uploaded on Jun. 1, 2016 by user "FluxVFX After Effects Templates". Retrieved from Internet: <https://www.youtube.com/watch?v=qRMqCP153eA>.*

Screen captures from YouTube video clip entitled "How to Work with Audio in After Effects—Tutorial," 3 pages, uploaded on Jan. 23, 2016 by user "Ignace Aleya". Retrieved from Internet: <https://www.youtube.com/watch?v=NwnmKjCLbTM>.*

Screen captures from YouTube video clip entitled "Text Messaging After Effects template customization tutorial," 5 pages, uploaded on Sep. 11, 2015 by user "FluxVFX After Effects Templates". Retrieved from Internet: <https://www.youtube.com/watch?v=JIFcLwV7Q5s>.*

Screen captures from YouTube video clip entitled "iPhone Text Effect + After Effects Project File!," 5 pages, uploaded on Mar. 25, 2017 by user "Learn How to Edit Stuff". Retrieved from Internet: <https://www.youtube.com/watch?v=XmxVxobekHo>.*

Screen captures from YouTube video clip entitled "Tutorial: How to make a YouTube animated outro—Part 2 (Photoshop/After Effects/Cinema 4D)," 5 pages, uploaded on Oct. 6, 2015 by user "YLLiBzify". Retrieved from Internet: <https://www.youtube.com/watch?v=yNwjgxAo6cM>.*

Bleeping Computer.com. 'Adobe After Effects CC 2014.1 rendering problem' (a tech support forum) [online]. Smashing Magazine, [online]. Nov. 23, 2014. [retrieved on Dec. 20, 2018]. Retrieved from the Internet <URL:https://www.smashingmagazine.com/2009/03/10-principles-for-readable-web-typography/>.*

"Make Your Lessons Memorable with the Texting Story App" The Techie Teacher, Archived Apr. 10, 2017. Accessed. Nov. 4, 2020. https://www.thetechieteacher.net/2017/04/make-your-lessons-memorable-with.html (Year: 2017).*

* cited by examiner

CHAT VIDEOS

BACKGROUND

Many users communicate through chat and message interfaces. In an example, two users may communicate using text messages that are displayed through text message interfaces hosted on mobile devices of the users. For example, a first user may send text, a video, a photo, an emoji, etc. through a text message to a second user. A text message interface, hosted on a device of the second user, may display messages received from the first user and messages that the second user has sent the first user. A group chat message interface may allow more than two users to communicate. For example, a group chat message interface, on the device of the second user, may display messages received from other users of a group chat and messages that the second user has sent the other users. It may be advantageous to convey conversations, speeches, and/or other story telling communication through such a format.

SUMMARY

In accordance with the present disclosure, one or more computing devices and/or methods for constructing a chat video are provided. In an example, a chat video creation interface is displayed for creating a chat video of a conversation. A participant definition, defining one or more participants (e.g., a person, an organization, a business, etc.) for the conversation, may be received through the chat video creation interface. The participant definition may specify a name, an avatar, a font type, a text color, a message element color, and/or other properties to assign to a participant.

A sequence of content items (e.g., text, images, videos, emoticons, emojis, etc.), to display through a chat interface for the conversation, may be received through the chat video creation interface. Music content, a background image, closing content, a designation to programmatically retrieve real-time content from a social network, and/or other information may be received through the chat video creation interface for constructing the chat video.

A sequence of message elements (e.g., chat bubbles) may be constructed for the conversation based upon the participant definition and the sequence of content items. Content items may be populated within message elements that are sized to visually fit such content items. Message elements and/or content items are assigned to participants that are to communicate corresponding content items within such message elements. Message elements may be ordered in a logical order for which content items are to be conveyed during the conversation. The sequence of message items are surfaced through the chat interface to create a rendering that is used to construct the chat video. In this way, the chat video can be played to playback the conversation conveyed by the sequence of message items being surfaced through the chat interface by participants.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
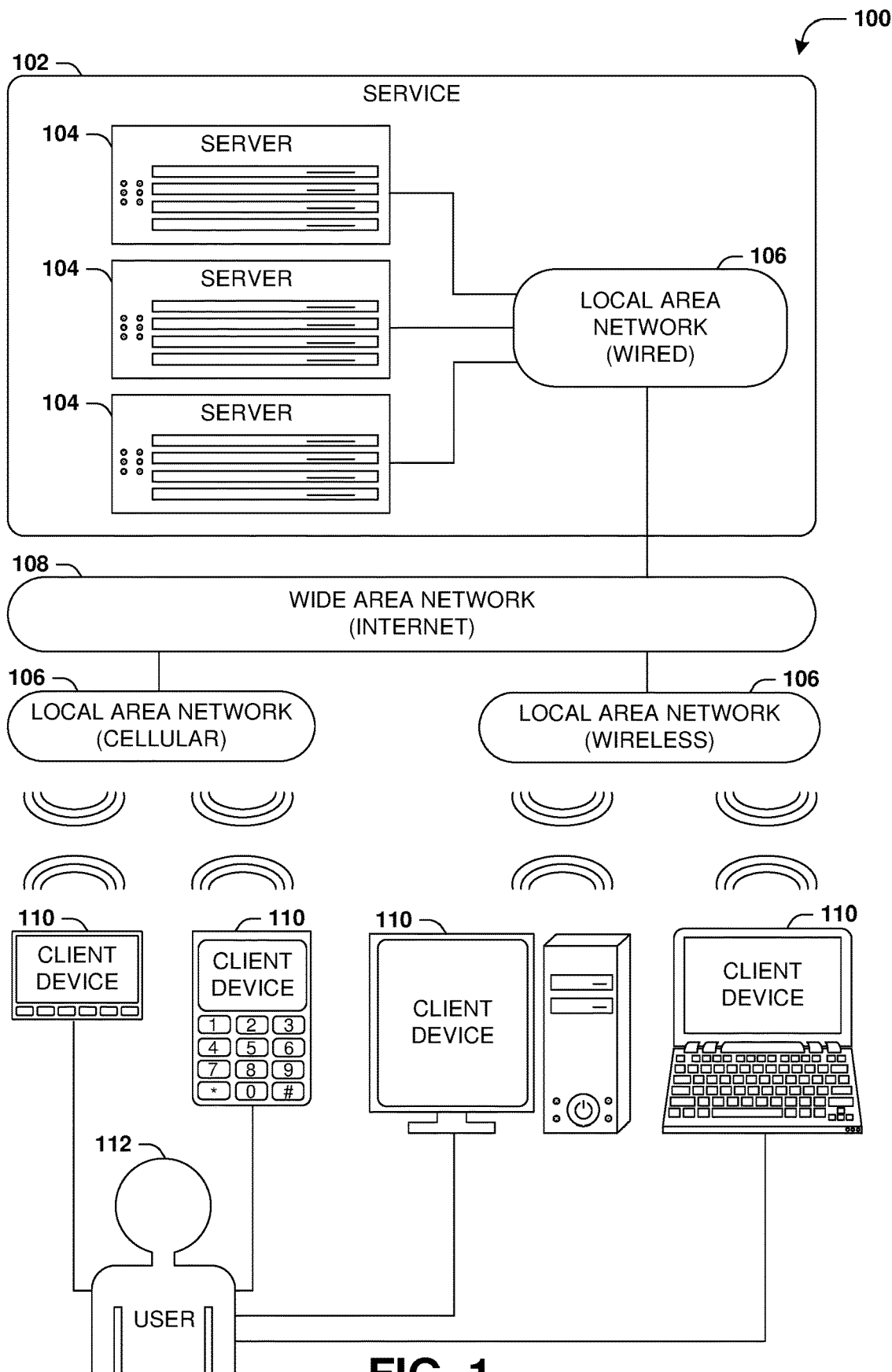
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
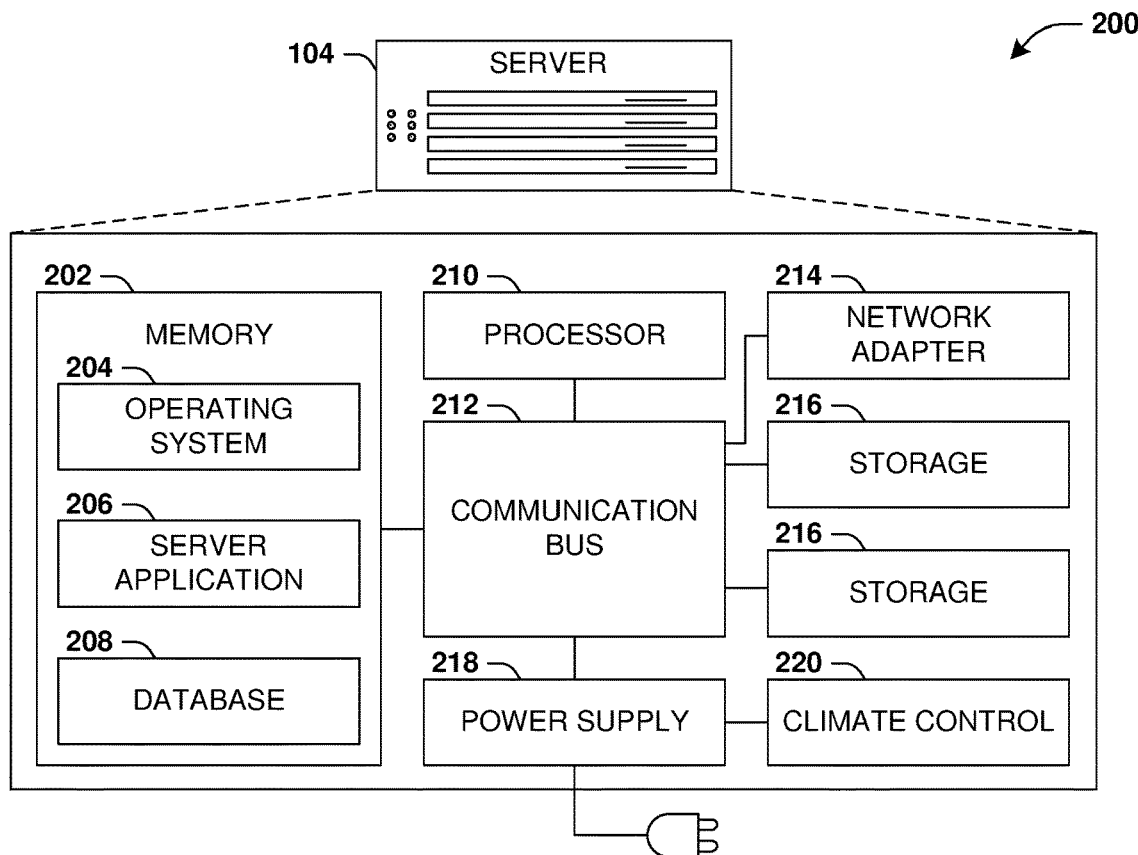
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
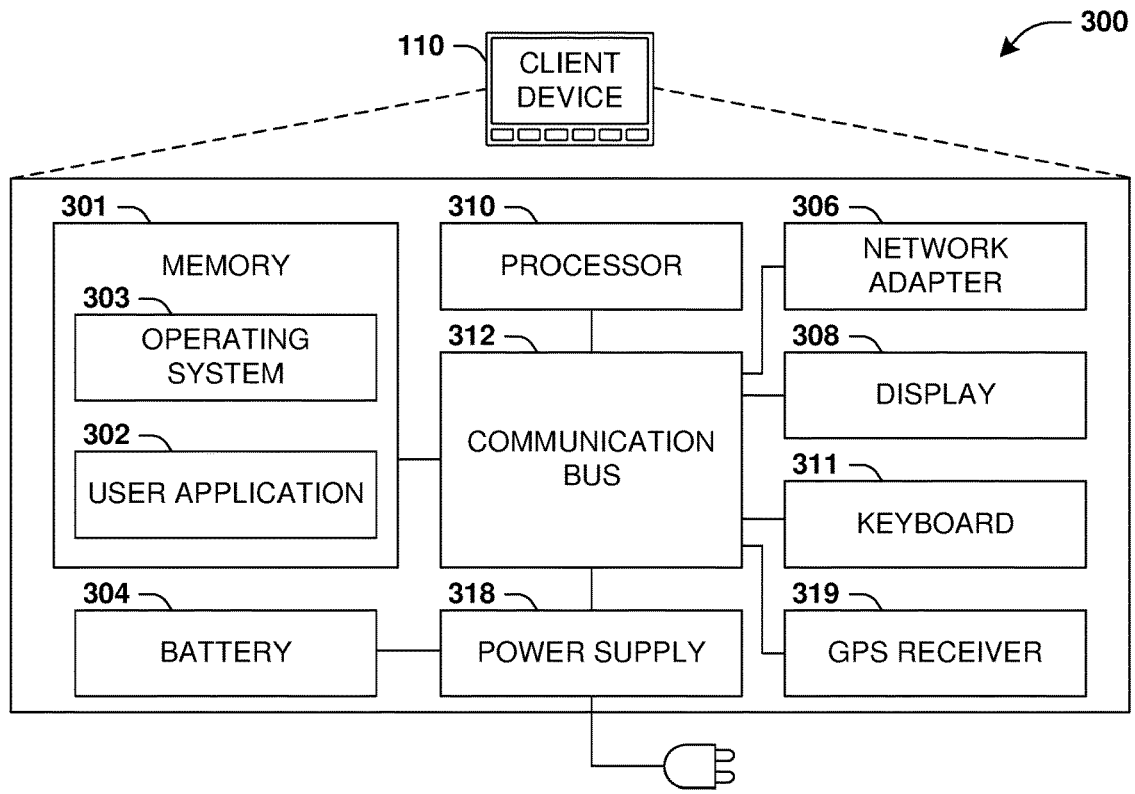
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for constructing chat videos are provided. For example, many users communicate through text and chat conversations that use text bubbles, images, emojis, videos, emoticons, etc. Accordingly, as provided herein, a conversation between participants can be defined and constructed into a chat video having a story telling format similar to text and chat conversations. During playback, the chat video displays the conversation in a visual style simulating a mobile chat or messaging session. Thus, the chat video provides a story telling communication tool of a way of expressing information with text over video.

Figure 4:
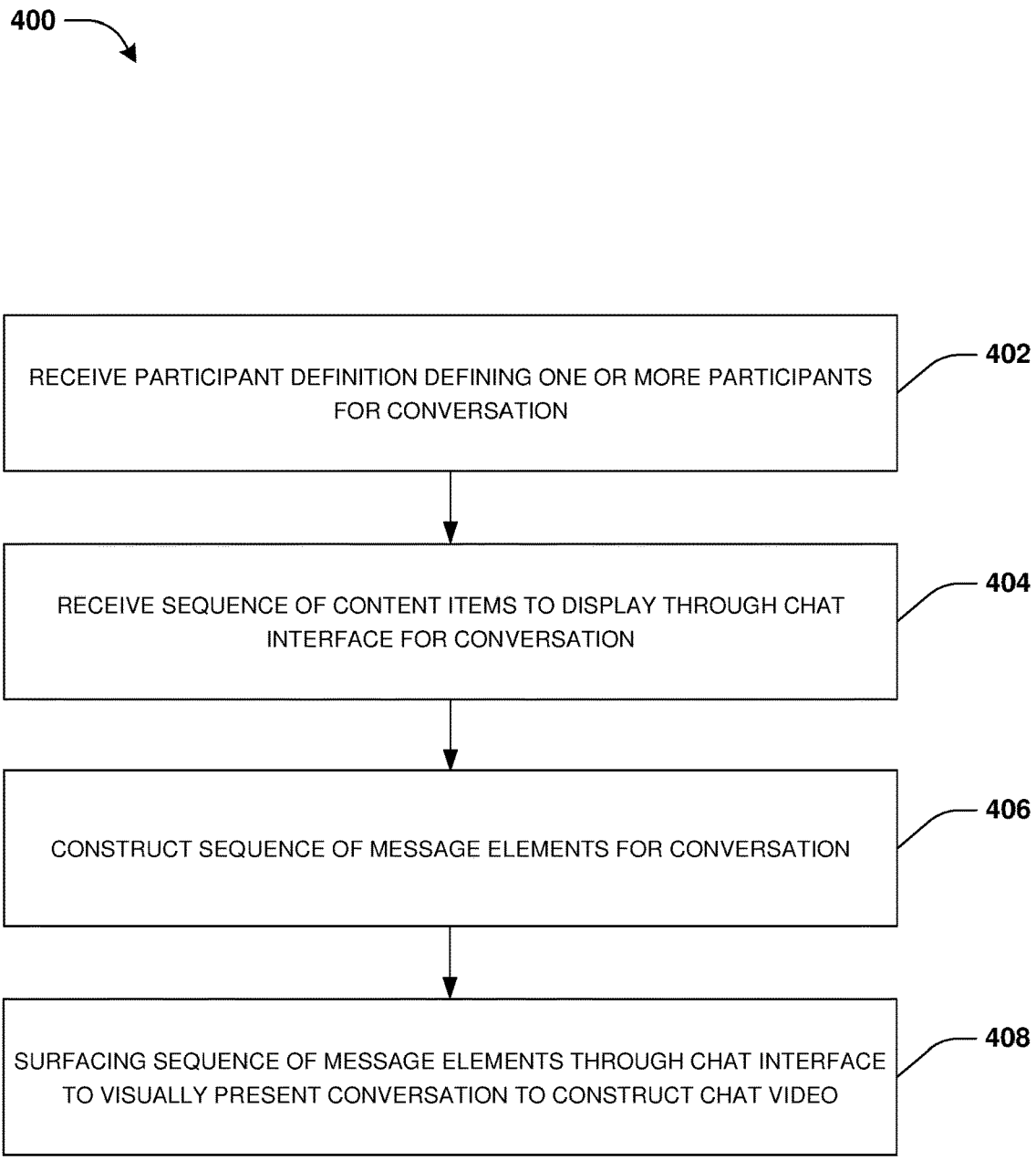
FIG. 4 is a flow chart illustrating an example method for constructing a chat video.

An embodiment of constructing a chat video is illustrated by an example method 400 of FIG. 4. At 402, a participant definition, defining one or more participants for a conversation, may be received such as through a chat video creation interface. For example, a user may desire to create a chat video between three fictitious characters, Sara, Dan, and Jack regarding a conversation about what are the best SUVs for families with 2 children. The user may define names, avatars (e.g., an image, animation, or other information used to visually represent a participant through a chat interface used to display the conversation), and/or other characteristics of Sara, Dan, and Jack through the chat video creation interface.

At 404, a sequence of content items, to display through the chat interface for the conversation, may be received such as through the chat video creation interface. For example, the user may submit text statements, images, videos, emojis, emoticons, hyperlinks, and/or other content that is to be communicated amongst the participants during the conversation displayed through the chat interface. In an example, the user may submit an instruction for real-time content to be extracted, such as microblogs, question and answer service content, forum content, or social network posts (e.g., an original post and comments and replies to the original post), as content items for inclusion within the sequence of content items. The sequence of content items may specify fonts, display sizes, text colors, message element colors, a display order, and/or other characteristics to apply to the content items and/or message elements through which the content items are to be displayed.

In an example, music content to play during playback of the chat video may be received for constructing the chat video (e.g., background music, a specific noise to play when a new message element is surfaced, etc.). In another example, a background image for display as a background for the chat interface may be received for constructing the chat video. In another example, a closing content item to display after playback of the conversation may be received for constructing the chat video (e.g., a closing message, a hyperlink, a link to an app store to download an application, a link to subscribe to content, a video to play after the sequence of content items have been played, etc.). In another example, default color schemes, default background images, default music, and/or other default parameters may be used when there is no specification of such.

At 406, a sequence of message elements (e.g., user interface elements such as chat bubbles through which content items can be displayed through the chat interface as a conversation occurring over time) may be constructed for the conversation based upon the participant definition and the sequence of content items. A message element comprises a content item and is assigned to a participant that is to communicate the content item through the message element during the conversation. For example, a red SUV photo content item may be populated within a first message element that is assigned to Dan such that Dan will communicate the first message element during the conversation. Text "I like that red SUV" may be populated within a second message element that is assigned to Sara such that Sara will communicate the second message element during the conversation. The sequence of message elements may be ordered such that the second message element may be surfaced/displayed after the first message element so that it appears that Sara is commenting on the red SUV photo content item previously communicated by Dan.

In an example, participants may be assigned to one or more sides of the chat interface. For example, Dan may be assigned to a left side of the chat interface so that message elements assigned to Dan are displayed as visually originating from the left side of the chat interface. Sara and Jack are assigned to a right side of the chat interface so that message elements assigned to Sara and Jack are displayed as visually originating from the right side of the chat interface. In this way, the conversation appears similar to a text or chat conversation.

At 408, the sequence of message elements are surfaced through the chat interface such as during a rendering phase by a rendering component that creates a chat video (e.g., where the chat video is stored as a chat video file) from the rendering. The rendering, recorded/stored within the chat video file, is a video of the sequence of message elements being surfaced through the chat interface to visually present the conversation such as in a story telling manner.

In one example of surfacing message elements, visual spacing is calculated to apply between the display of the first message element and the second message element so that the first message element and the second message element are not displayed overlapping one another through the chat interface (e.g., a certain number or region of pixels may be designated as the visual spacing). In another example of surfacing message elements, a timing between surfacing the first message element and the second message element may be calculated and applied to the construction/rendering of the chat video (e.g., message elements may be display every 7 seconds or at a time determined based upon a length of a message element or estimated amount of time for a user to interpret and experience of a message element). In another example of surfacing message elements, the sequence of message elements may be surfaced in a vertical scroll order from a top side of the chart interface to a bottom side of the chat interface or from the bottom side to the top side. In another example of surfacing message element, a display size (e.g., a display height) for a message element may be determined based upon a characteristic (e.g., a size) of a content item to display through the message element.

The chat video may be stored as the chat video file. In an example, the chat video file may be compressed. Responsive to receiving a request to play the chat video file, the chat video file may be played to render the chat interface for playback of the conversation (e.g., message elements may be sequentially surfaced in a specified order at certain time intervals and having certain visual characteristics as if Dan, Sara, and Jack were having a message conversation such as through a mobile chat application).

Various information and feedback may be provided through the chat video creation interface. For example, any rendering errors from constructing the chat video may be displayed through the chat video creation interface. Input data, used to construct the chat video, may be displayed through the chat video creation interface for verification by the user.

In this way, the chat video may be constructed as a storytelling format used to convey information through a conversation presented similar to a chat or message conversation.

Figure 5A:
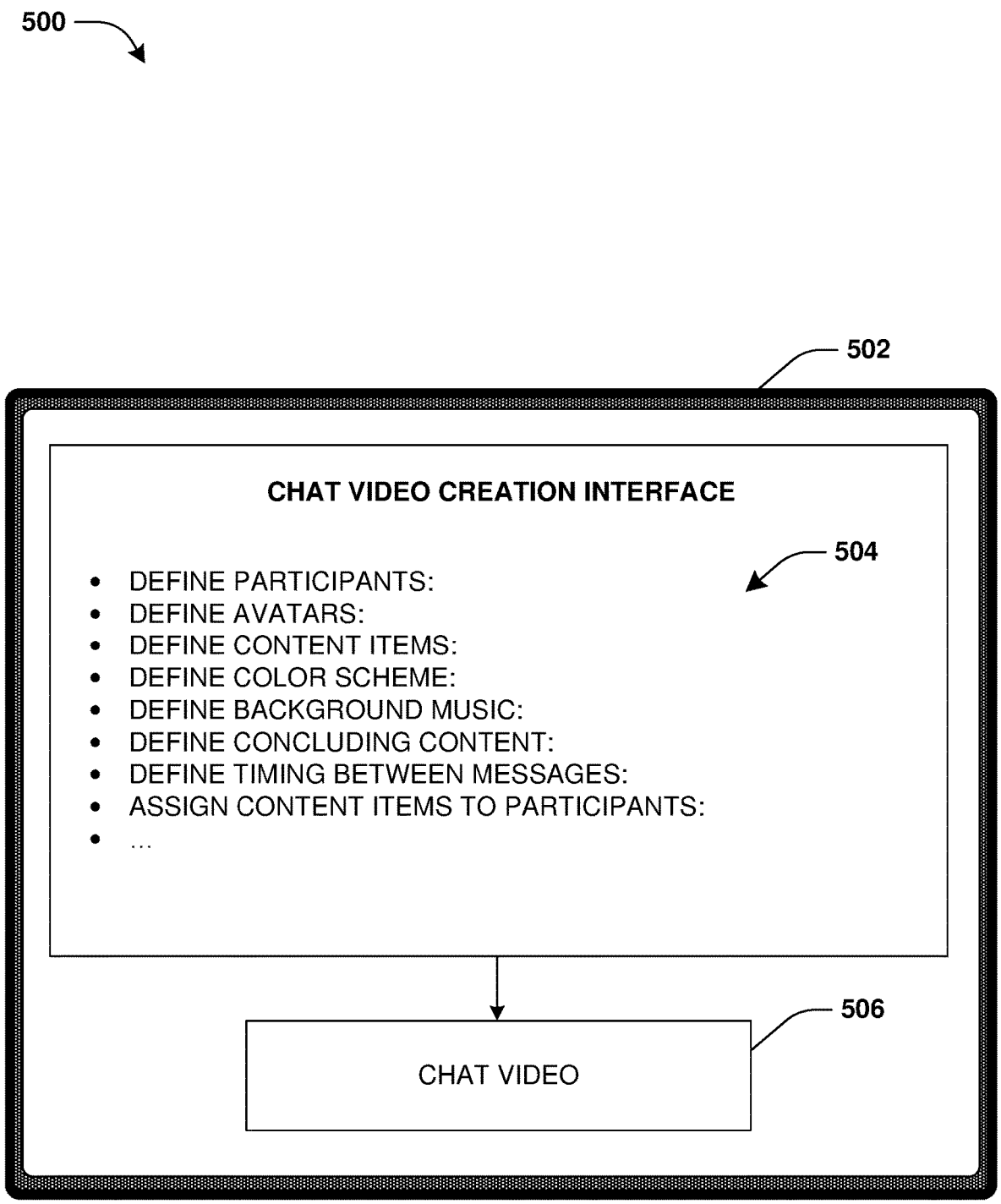
FIG. 5A is a component block diagram illustrating an example system for constructing a chat video, where a chat video creation interface is displayed.

FIGS. 5A-5F illustrate examples of a system 500 for constructing a chat video 506. FIG. 5A illustrates a chat video creation interface 504. A user may define various information used to construct the chat video 506 through the chat video creation interface 504. For example, the user may define participants of a conversation that will be communicated through a chat interface rendered through the chat video 506 (e.g., a single participant or any number of participants). The user may define avatars to represent the participants. The user may define content items (e.g., images, videos, text, emojis, emoticons, etc.) to display through message elements that are to be communicated by the participants through the chat interface.

The user may define a color scheme, such as text colors, message element colors, background colors, etc. to apply to the chat interface. The user may define music to play during playback of the chat video. The user may also define other sounds to play, such as a noise to play when a message element is surfaced. The user may define concluding content such as a message and link to a website to display after playback of the conversation through the chat video. The user may define timing between when a message and a next message is surfaced. The user may assign content items to participants in order to specify what information each participant will communicate during the conversation. In this way, the chat video 506 is constructed by rendering the conversation where message elements, comprising content items, are surfaced through the chat display in a manner as though the participants are communicating through the chat interface.

Figure 5B:
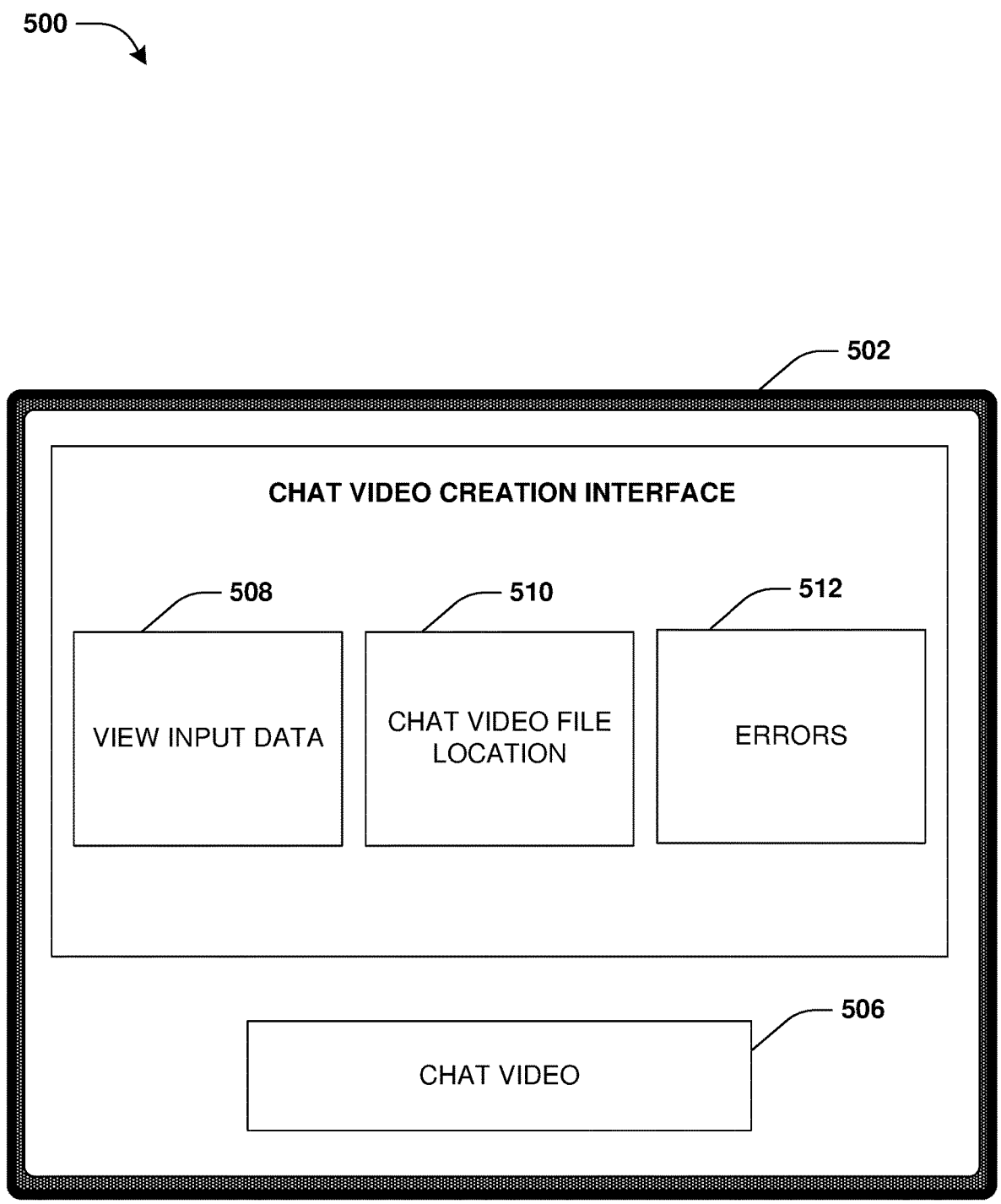
FIG. 5B is a component block diagram illustrating an example system for constructing a chat video, where a chat video creation interface is displayed.

FIG. 5B illustrates feedback information provided through the chat video creation interface 502. The feedback information may relate to the construction and/or rendering of the chat video 506. For example, the user can view input data 508 used to construct/render the chat video 506, view a storage location 510 of a chat video file comprising the chat video 506, view any errors 512 that occurred during rendering, etc.

Figure 5C:
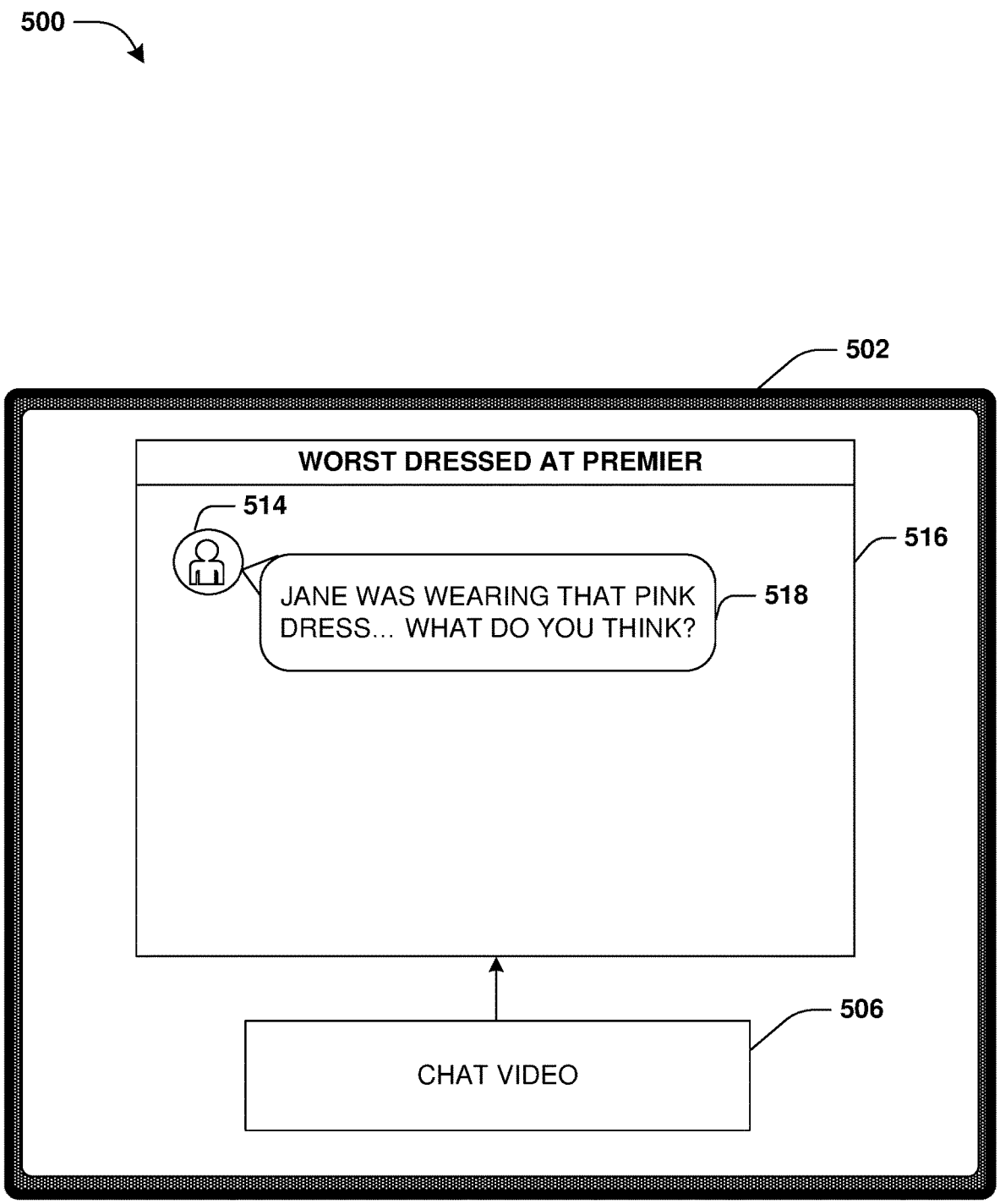
FIG. 5C is a component block diagram illustrating an example system for constructing a chat video, where a message element of text is surfaced.

FIG. 5C illustrates playback of the chat video 506. For example, a title "Worst Dressed at Premier" may be displayed for a chat interface 516 of the chat video 506. A first avatar 514 for a first participant may be displayed on a left side of the chat interface 516. A first message element 518, comprising a text content item "Jane was wearing that pink dress . . . what do you think?" assigned to the first participant, may be surfaced through the chat interface 516 (e.g., in a manner that appears where the first avatar 514 communicated the first message element 518). A shape, size, position, font, color, surfacing timing, and/or other parameters for the first message element 518 may be calculated and used based upon the text content item and/or parameters specified for the first participant.

Figure 5D:
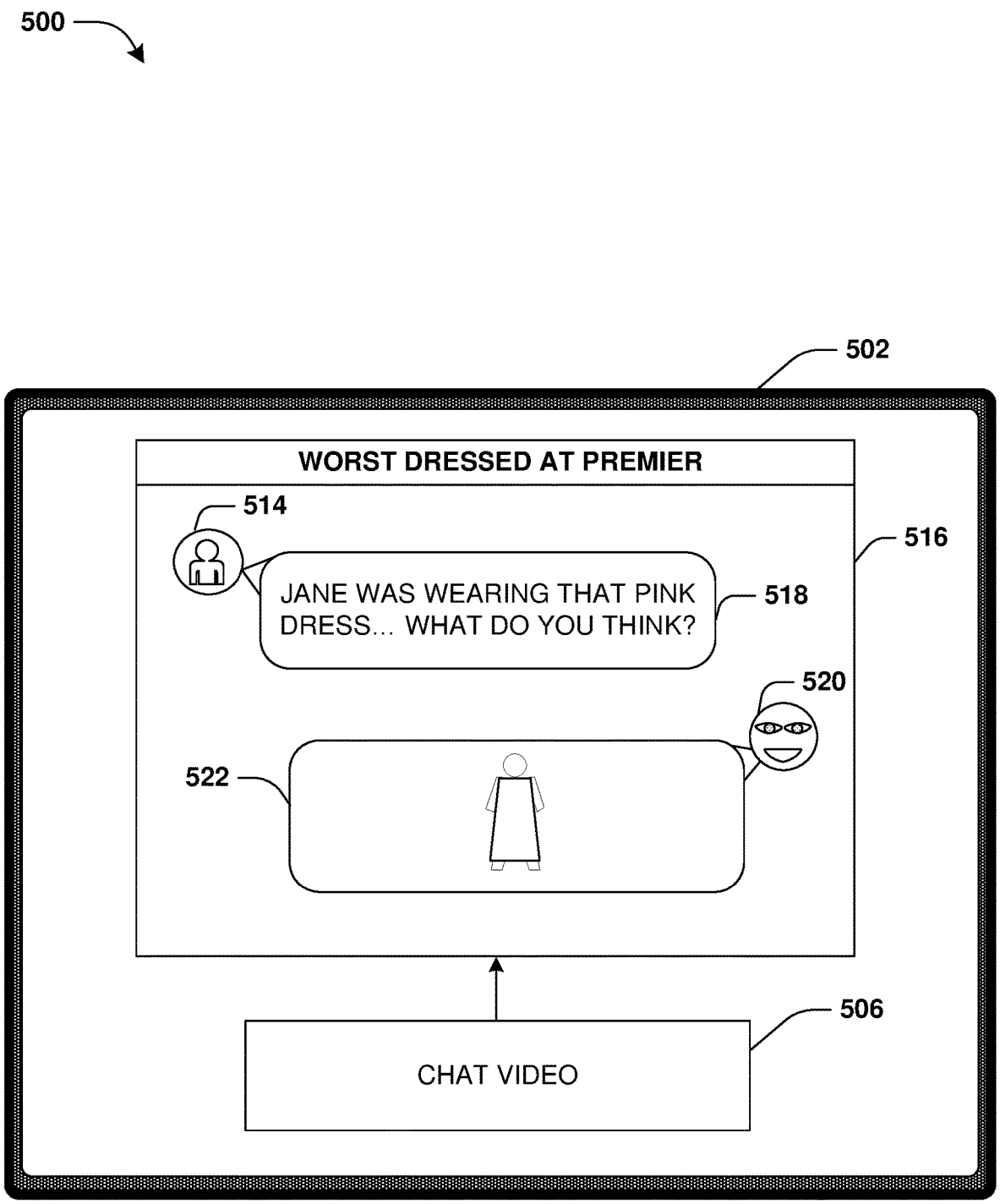
FIG. 5D is a component block diagram illustrating an example system for constructing a chat video, where a message element of a photo is surfaced.

FIG. 5D illustrates playback of the chat video 506. For example, a second avatar 520 for a second participant may be displayed for the chat interface 516. A second message element 522, comprising an image content item assigned to the second participant, may be surfaced through the chat interface 516 (e.g., in a manner that appears where the second avatar 520 communicated the second message element 522). A timing for which the second message element 522 is surfaced relative to the first message element 518 being surfaced may be predefined or may be calculated based upon the image content item and/or parameters specified for the second participant. A display location of the second message element 522 may be calculated based upon a length and/or size of the image content item and/or a size and display position of the first message element 518. In this way, a shape, size, position, font, color, surfacing timing, and/or other parameters for the second message element 522 may be calculated and used based upon the image content item and/or parameters specified for the second participant.

Figure 5E:
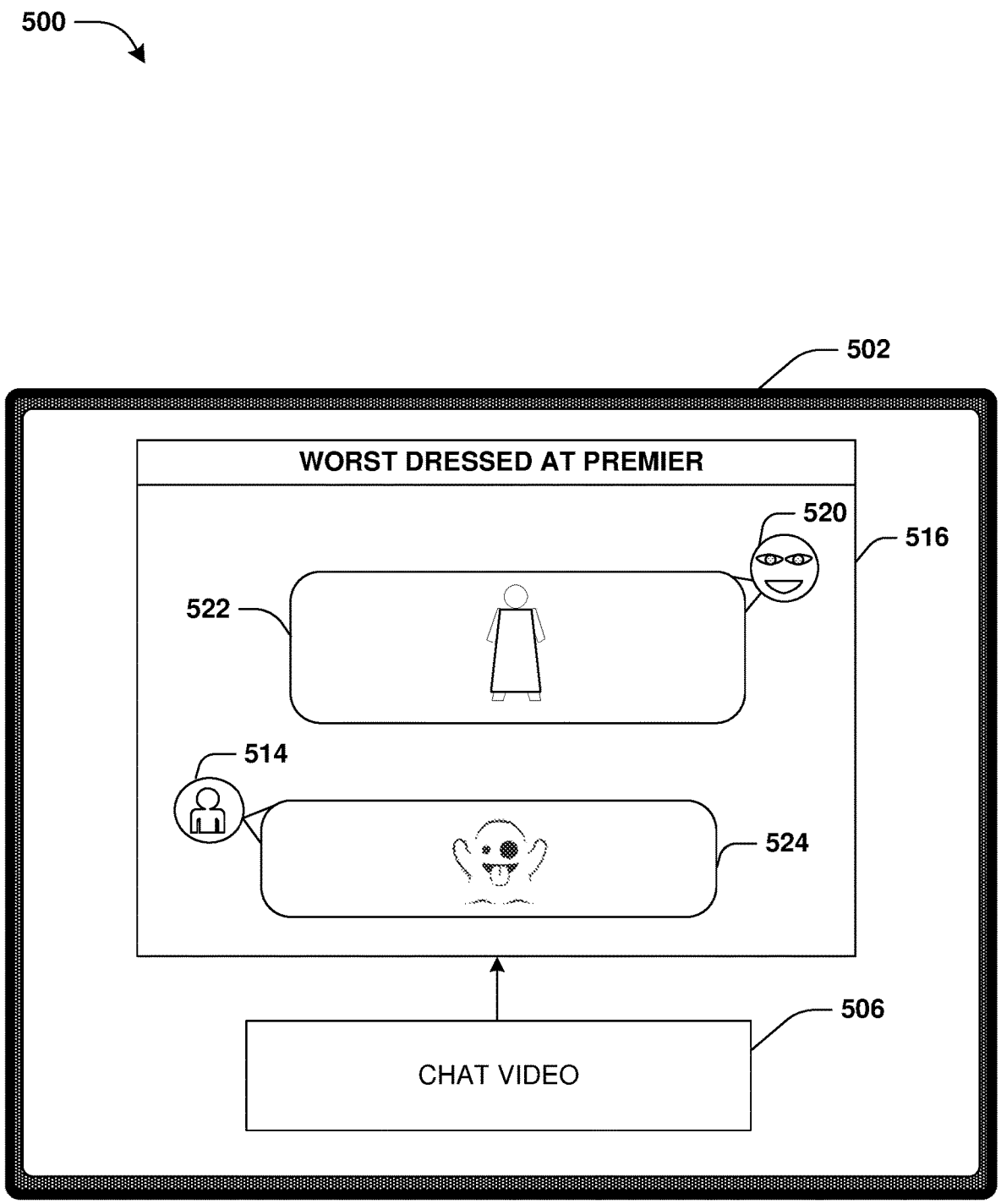
FIG. 5E is a component block diagram illustrating an example system for constructing a chat video, where a message element of an emoticon is surfaced.

FIG. 5E illustrates playback of the chat video 506. For example, the first avatar 514 for the first participant may be displayed for the chat interface 516. A third message element 524, comprising an emoji content item assigned to the first participant, may be surfaced through the chat interface 516 (e.g., in a manner that appears where the first avatar 514 communicated the third message element 524). A timing for which the third message element 524 is surfaced relative to the second message element 522 being surfaced may be predefined or may be calculated based upon the emoji content item and/or parameters specified for the first participant. A display location of the third message element 524 may be calculated based upon a length and/or size of the emoji content item and/or a size and display position of the second message element 522. In this way, a shape, size, position, font, color, surfacing timing, and/or other parameters for the third message element 524 may be calculated based upon the image content item and/or parameters specified for the first participant.

Figure 5F:
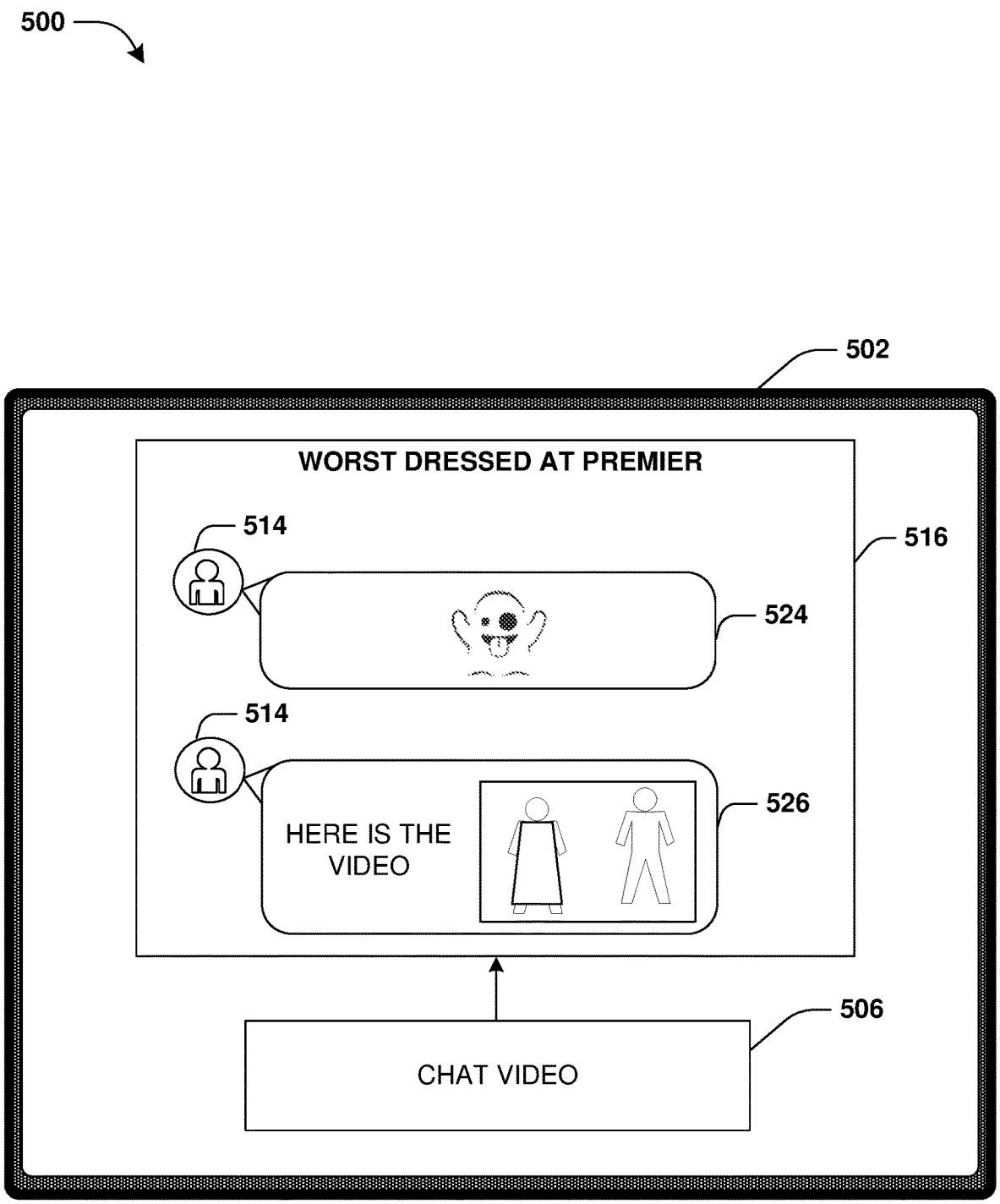
FIG. 5F is a component block diagram illustrating an example system for constructing a chat video, where a message element of a video is surfaced.

FIG. 5F illustrates playback of the chat video 506. For example, the first avatar 514 for the first participant may be displayed for the chat interface 516. A fourth message element 526, comprising a video content item assigned to the first participant, may be surfaced through the chat interface 516 (e.g., in a manner that appears where the first avatar 514 communicated the fourth message element 526). A timing for which the fourth message element 526 is surfaced relative to the third message element 524 being surfaced may be predefined or may be calculated based upon the video content item and/or parameters specified for the first participant. A display location of the fourth message element 526 may be calculated based upon a length and/or size of the video content item and/or a size and display position of the third message element 524. In this way, a shape, size, position, font, color, surfacing timing, and/or other parameters for the fourth message element 526 may be calculated and used based upon the image content item and/or parameters specified for the first participant.

A chat video is a format and process that facilitates storytelling in a new way. Data is gathered, organized, and presented using user-input text, media, and algorithmic timing to produce an output video in a visual style simulating a mobile chat or messaging session. The content of the messages may be taken automatically or manually from real sources such as a social network service, a photo sharing service, or creatively generated by the user.

In an example, a participant is a virtual entity in the messaging environment. This is typically a person but could also represent a non-person entity such as a corporation or organization. Each chat video has at least one participant, up to an essentially unlimited amount, all of which are not necessarily seen or active for the entire duration of the video. Each participant has a name, an avatar image, and the side of the screen (left or right) that their messages appear. The side chosen can also affect the visual appearance (such as color) of that participant's messages.

In an example, a message element is a single simulated chat-style message containing the name and avatar of the participant linked to the message, if appropriate (notification-typed messages are not linked to a participant), an optional visual indicator for the message such as a chat quote "bubble" background with a stub connecting it to the "speaker" (participant), and the content of the message, which can be text including emojis, an image or other media, an emoticon (single-character emoji), or notification text that acts to impart non-sourced information such as participants entering or leaving the session.

In an example, an emoticon is a single emoji character displayed as a message in a larger size than normal text.

A user inputs data into a chat video creation interface such as a web-based form, a native app (mobile or desktop), or directly into a bulk data format such as JSON, XML, CSV, etc. User inputs text, makes creative choices and selections, and uploads media. The input may comprise metadata (e.g., a title, email address for notifications, etc.), a list of participants (e.g., a name, side (left or right), textbox color, text color, avatar image, etc. per participant), a list of content items to display through message elements (e.g., a message type, associated participant (if appropriate), typed content data (chat text, image, emoticon, notification text), etc. for a message element).

The user defines all participants, then defines the content items of the message elements attached to each participant, in order such that the final video will flow in a manner similar to an actual text messaging session on a mobile device.

When the user is finished entering the metadata, participants, and messages, the user submits the form.

Form data gets marshalled and formatted through an intermediate step (Zapier). Data added includes a unique key of template name, entry number, and entry form link. This gets composed into a mail message and is sent to the address of a server (e.g., a render server) in plain text, although it could be JSON, XML, CSV, or other data format.

The render server maintains a list of available templates that it knows how to process. The render server filters incoming email submissions on template keys, then matches them to internal templates.

In an example, a template comprises an after effects project file combined with custom code describing various aspects including a unique string for identifying submissions of the entries for this template, the data format keys to be parsed from the data, render file paths, various timing factors, and custom logic. In an example, a comp comprises an after effects composition. In an example, a layer comprises an after effects layer. In an example, a mod comprises a JSON fragment that is injected into script for the renderer to execute. The mod represents some modification to be made to the render project file, targeted to a named layer within a named composition ("comp"). An image mod replaces a media layer (image, video) with a new file on disk. An audio mod replaces an audio layer with a new file on disk. An audio level mod sets a keyframe that specifies the audio level (in decibels) at a specific frame. A text mod replaces text in a text layer with a string. A color mod replaces the color in a color effect with a new RGBA color. A highlight text range mod sets the color for a specified range of characters in a text layer. A visibility mod sets the visibility property of a layer (on or off). A visibility all mod sets the visibility property of all layers within a named comp, optionally restricting to text layer types only. A keyframe mod sets a keyframe on a specified after effects property type at a specified frame, with optional frame interpolation and easing values. A clear all keyframes mod clears all keyframes from a named layer for a specified after effects property.

During a pre-processing phase when a matching submission is found, message text is broken down into sections (metadata, repeating sections for people and messages) and data is scrubbed (cleans up URLS, trims spaces from text start and end, removes illegal characters). A hashed UUID is formed based on the email message ID which can be used to identify if the same message gets submitted again subsequently. Each submission forms one Job (which gets the submission UUID) containing one or more Render Items.

Data is processed into key-value pair dictionaries where the key is a coded internal String that can be referred to during processing. Keys for repeating items (lists) are prefixed with the repeating section number.

URL links are followed and source media (images, audio, animated GIF, video, etc.) uploaded to the front end form or an app is downloaded locally. Image data is opened and re-saved in a known format to ensure file extensions are correct for the renderer. The file paths of the downloaded media are noted and stored in variables to allow linking them to mods in the render script.

Custom code applies logic based on the data to parse the submission into renderable format. These are JSON fragments that will be injected into a Javascript via a text templating mechanism.

Participants are looped over to read their name and preferences for side and colors that the user entered in the form. Messages are looped over to switch on their type and process appropriately for that type, such as images (e.g., form and image mod), text (e.g., form a text mod, or, if pre-rendering text is activated, pre-render the text into an image and for an image mod linked to the rendered image file), emoticon (e.g., form and image mod using the static asset emoticon image file URL, or, if pre-rendering text is activated, pre-render the text into an image and for an image mod linked to the rendered image file), and notification (e.g., form a text mod).

Adjust starting ("in") time of each message layer such that they are staggered and when rendered will appear in the desired order, one after another, with variable timings based on the message type and/or user-entered override timing. The custom timing ensure readability/watchability of the content as well as facilitate the illusion of a real-time messaging session taking place. Text messages use a formula based on the length of text, images and emoticons have a fixed timing.

The total duration of the render is set to the accumulated time of all active elements. An audio mod is set to fade out audio at the end of the render. Text messages are optionally pre-rendered as images. This ensures the renderer has the correct fonts and enables rendering of emoji characters, which are not supported natively by Adobe After Effects. The message quote bubble is also rendered into the image in the correct color and facing the correct side.

A text templating engine is used to inject all mods and needed metadata into a pre-existing script (currently JavaScript). Metadata includes the render item UUID, socket server address and port to establish communications, project path, render output file path, all mods, the time span to render, the render settings and output module to use, and more.

The parsed render item is added to a render queue in the order the submission was received. Certain operations may happen simultaneously, for example new submissions can be checked while a render is occurring, assets are being downloaded, final renders are being compressed, or final renders are being uploaded. A local socket server is started to communicate with the After Effects rendering application. An after effects application is launched if necessary, wait until it is available (launched and not currently rendering anything), and pass the script to it as data. A timeout time is set in case render fails for some reason that cannot be communicated. In this case, restart the rendering application and move this render item to the back of the queue, mark as ready for rendering to retry.

During a rendering phase in an after effects render client, the after effects render client receives the script from the render server and executes it. All data passed from render server is stored in variables. All mods are looped through and applied in a specific order. Each mod type may perform different functions depending on its type. For example a text mod will first check to make sure the named layer inside the named comp exists. Then it checks to make sure it is of the proper type (in this case a TextLayer). If a font a size are specified it will apply them. Then it sets the value of the "Source Text" property to the specified string value, and optionally applies tracking and scaling adjustments to fit the text to a specified width in pixels. An image mod will replace a media layer's linked content with a specified file and optionally apply auto-sizing adjustments such as fitting to width or height, or to the image's smallest or largest dimension.

A preview image is rendered at a specified time in a named comp. Report the file path of the image to the render server via socket communication. This image will be sent in the user notification when the render is complete.

The specified render settings and output module for the final render are set, and the render time span (start and duration) is set based on the values that were previously calculated by the render server. The final render is performed. When render is complete, report the file path of the rendered movie to the render server via socket communication, which also indicated that the render has completed and the post-processing phase by the render server may now begin.

If any errors or irregularities are encountered during execution, report them back to the render server via socket communication. For example, if a media file can't be found or can't be opened properly, or if text needed to be adjusted to fit. These can be used to report the information back to users and/or administrators, as appropriate.

During a post-processing phase when rendering is complete or error occurs, if rendering was unsuccessful because of an error, log the error and report it to system administrators. If rendering was successful, begin a compression process to reduce file size. When compression is complete, the file path of the compressed file is marked and upload it to cloud-based storage, and optionally copy to local storage (such as to an attached SAN). When uploading is complete, for a notification for the user is sent as an HTML-formatted email, including various metadata (render stats, the job UUID, etc.), the preview image as an inline attachment, and links to the final rendered file (in cloud storage and/or local storage). The email is sent and the original email is marked as read so it is not picked up for re-rendering in subsequent submission checks. All files used in the process are cleaned up, including downloaded assets, local render files, and local passlog files from the compression process. Output is delivered as a video file and the user is notified of the completed render along with links to the file's location(s).

Figure 6:
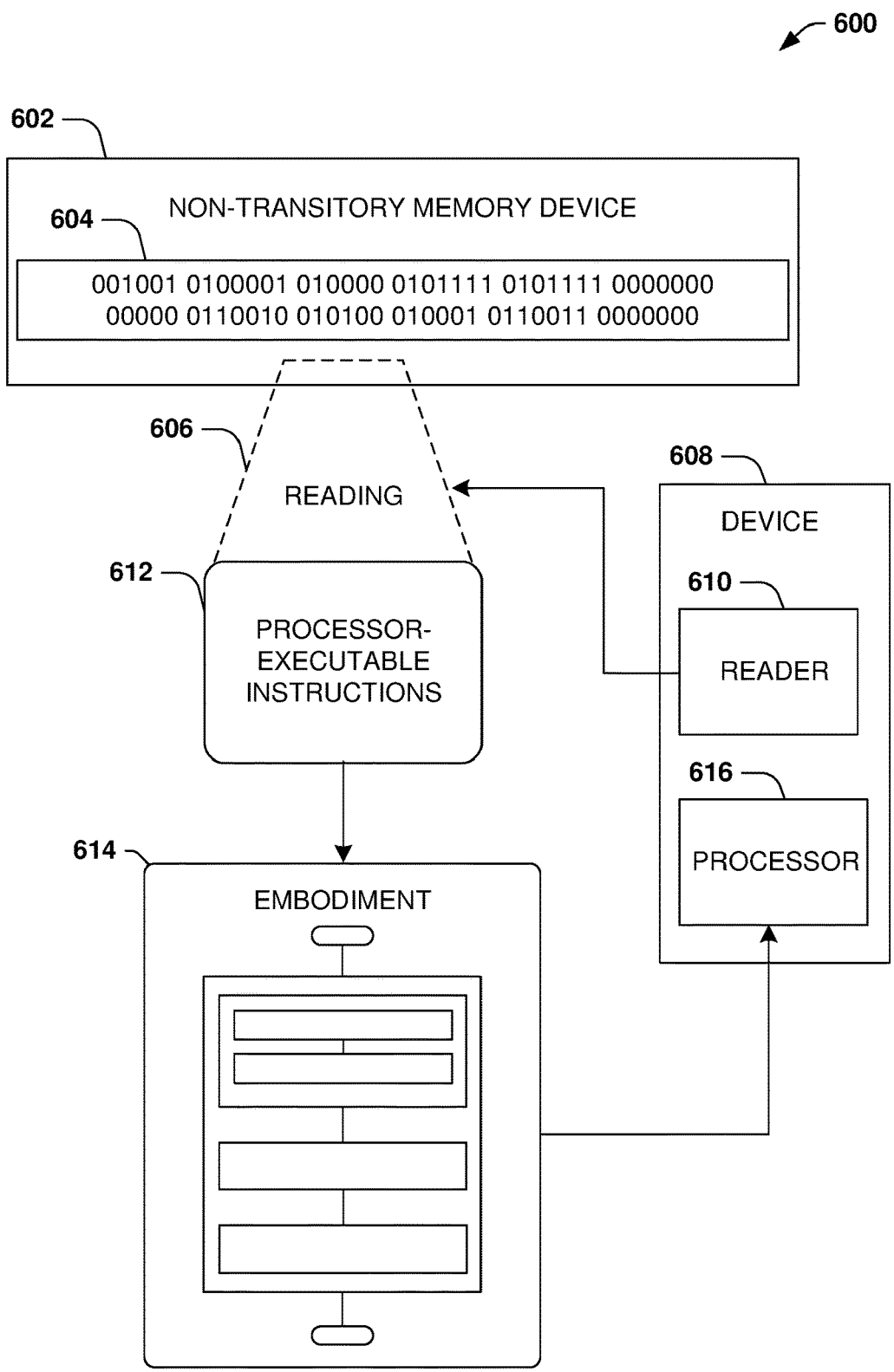
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
displaying a chat video creation interface to a user;
receiving, via the chat video creation interface and from the user, a participant definition defining one or more participants for a conversation;

receiving, via the chat video creation interface and from the user, a sequence of content items to display through a chat interface for the conversation;

determining a first timing definition associated with a first content item of the sequence of content items based upon the first content item comprising text, wherein the first timing definition is based upon a length of the text of the first content item;

determining a second timing definition associated with a second content item of the sequence of content items based upon the second content item comprising an emoticon, wherein the second timing definition is different than the first timing definition;

determining a third timing definition associated with a third content item of the sequence of content items, wherein the third content item is a real-time content item programmatically retrieved from a social network responsive to a user instruction received through the chat video creation interface;

automatically constructing a sequence of message elements for the conversation based upon the participant definition, the sequence of content items, the first timing definition, the second timing definition and the third timing definition, wherein a first message element of the sequence of message elements comprises the first content item and is assigned to a first participant, a second message element of the sequence of message elements comprises the second content item and is assigned to a second participant, and a third message element of the sequence of message elements comprises the third content item and is assigned to at least one of the first participant or the second participant;

surfacing the sequence of message elements through the chat interface to visually present the conversation to construct a chat video; and storing the chat video as a chat video file.

2. The method of claim 1, comprising:
assigning the first participant to a first side of the chat interface so that message elements assigned to the first participant are displayed as visually originating from the first side; and
assigning the second participant to a second side of the chat interface so that message elements assigned to the second participant are displayed as visually originating from the second side.

3. The method of claim 1, wherein the participant definition specifies an avatar to use for visually representing at least one of the first participant or the second participant through the chat interface.

4. The method of claim 1, wherein the sequence of content items specifies a text color and a message element color for displaying at least one content item through at least one message element.

5. The method of claim 1, comprising:
receiving music content to play during playback of the chat video; and
constructing the chat video to include the music content for playback.

6. The method of claim 1, wherein the constructing the chat video comprises:
determining a display height for at least one message element based upon a characteristic of at least one content item to display through the at least one message element.

7. The method of claim 1, comprising:
receiving a background image for display as a background for the chat interface; and
constructing the chat video to use the background image as the background during playback.

8. A computing device comprising:
a processor; and
memory comprising processor-executable instructions that when executed by the processor cause performance of operations, the operations comprising:
displaying a chat video creation interface to a user;
receiving, via the chat video creation interface and from the user, a participant definition defining one or more participants for a conversation;
receiving, via the chat video creation interface and from the user, a sequence of content items to display through a chat interface for the conversation;
assigning a first set of the sequence of content items to a first participant and a second set of the sequence of content items to a second participant;
determining a first timing definition associated with a first content item of the sequence of content items based upon the first content item comprising text, wherein the first timing definition is based upon a length of the text of the first content item;
determining a second timing definition associated with a second content item of the sequence of content items based upon the second content item comprising an image, wherein the second timing definition is different than the first timing definition;
determining a third timing definition associated with a third content item of the sequence of content items, wherein the third content item is a real-time content item programmatically retrieved from a social network responsive to a user instruction received through the chat video creation interface;
automatically constructing a sequence of message elements for the conversation based upon the participant definition, the sequence of content items, the first timing definition, the second timing definition and the third timing definition, wherein a first message element of the sequence of message elements comprises the first content item and is assigned to the first participant, a second message element of the sequence of message elements comprises the second content item and is assigned to the second participant, and a third message element of the sequence of message elements comprises the third content item and is assigned to at least one of the first participant or the second participant;
surfacing the sequence of message elements through the chat interface to visually present the conversation to construct a chat video; and
storing the chat video as a chat video file.

9. The computing device of claim 8, wherein the operations comprise:
calculating a visual spacing to apply between display of the first message element and the second message element; and
applying the visual spacing to the chat interface.

10. The computing device of claim 9, wherein the visual spacing is calculated so that the first message element and the second message element do not visually overlap within the chat interface.

11. The computing device of claim 8, wherein:
the third message element, comprising the third content item, is assigned to the first participant and is associated with a first amount of time; and the second message element, comprising the second content item comprising the image, is assigned to the second participant and is associated with the first amount of time.

12. The computing device of claim 8, wherein the surfacing comprises:
    surfacing the sequence of message elements in a vertical scroll order from a top side of the chat interface to a bottom side of the chat interface.

13. The computing device of claim 8, wherein the surfacing comprises:
    surfacing the sequence of message elements in a vertical scroll order from a bottom side of the chat interface to a top side of the chat interface.

14. A non-transitory machine readable medium having stored thereon processor-executable instructions that when executed cause performance of operations, the operations comprising:
    displaying a chat video creation interface to a user;
    receiving, via the chat video creation interface and from the user, a participant definition defining one or more participants for a conversation;
    receiving, via the chat video creation interface and from the user, a sequence of content items to display through a chat interface for the conversation;
    determining a first timing definition associated with a first content item of the sequence of content items based upon the first content item comprising text, wherein the first timing definition is based upon a length of the text of the first content item;
    determining a second timing definition associated with a second content item of the sequence of content items based upon the second content item comprising a type of content different than text, wherein the second timing definition is different than the first timing definition;
    determining a third timing definition associated with a third content item of the sequence of content items, wherein the third content item is a real-time content item programmatically retrieved from a social network responsive to a user instruction received through the chat video creation interface;
    constructing a sequence of message elements for the conversation based upon the participant definition, the sequence of content items, the first timing definition, the second timing definition and the third timing definition, wherein a first message element of the sequence of message elements comprises the first content item and is assigned to a first participant, a second message element of the sequence of message elements comprises the second content item and is assigned to a second participant, and a third message element of the sequence of message elements comprises the third content item and is assigned to at least one of the first participant or the second participant;
    surfacing the sequence of message elements through the chat interface to visually present the conversation to construct a chat video;
    storing the chat video as a chat video file; and
    responsive to receiving a request to play the chat video file, playing the chat video file to render the chat interface for playback of the conversation.

15. The non-transitory machine readable medium of claim 14, wherein the operations comprise:
    receiving a closing content item to display after playback of the conversation.

16. The non-transitory machine readable medium of claim 14, wherein the constructing the chat video is performed automatically.

17. The non-transitory machine readable medium of claim 14, wherein the operations comprise:
    displaying a rendering error, associated with constructing the chat video, through the chat video creation interface.

18. The non-transitory machine readable medium of claim 16, wherein the operations comprise:
    displaying input data, used to construct the chat video, through the chat video creation interface for verification.

19. The non-transitory machine readable medium of claim 14, wherein the operations comprise:
    compressing the chat video.

20. The non-transitory machine readable medium of claim 15, wherein the operations comprise:
    constructing the chat video to include the closing content item after display of the sequence of message elements.

* * * * *